United States Patent Office 2,919,401
Patented Dec. 29, 1959

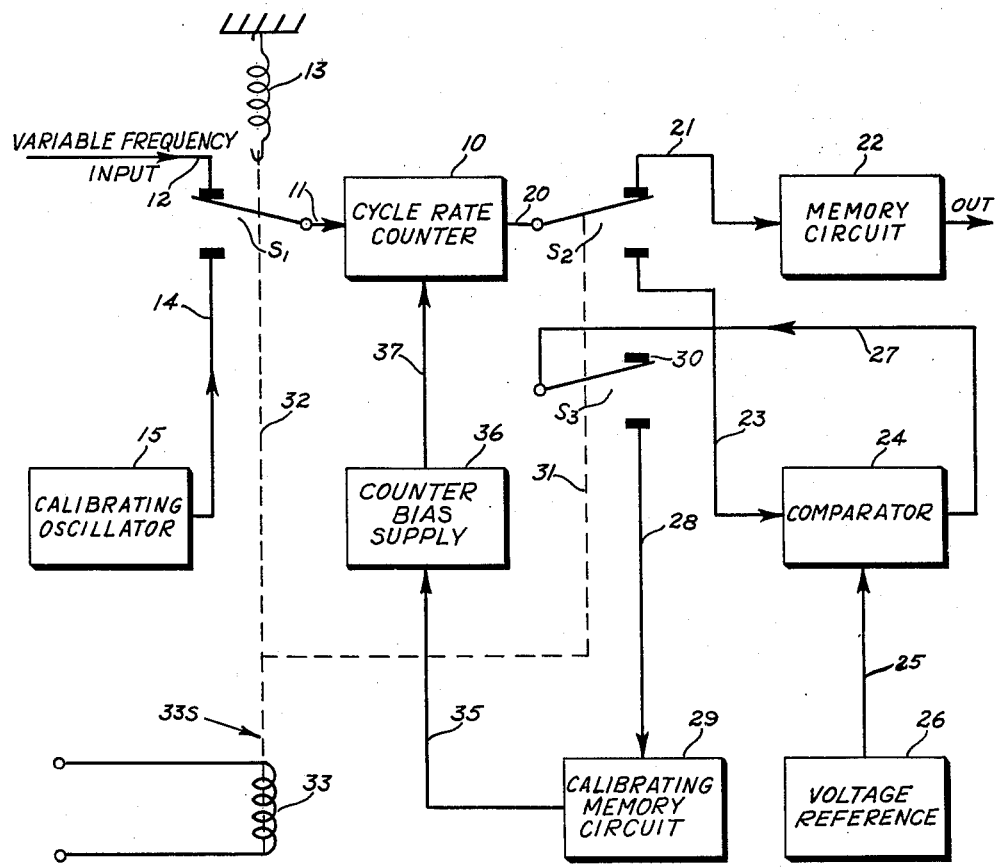

2,919,401

AUTOMATIC CALIBRATION CIRCUIT

Benjamin R. Cole, Arlington, and Edward J. Sheldon, Jr., Lexington, Mass., assignors, by mesne assignments, to the United States of America as represented by the Secretary of the Navy Application December 30, 1958, Serial No. 784,009

11 Claims. (Cl. 324—74)

This invention relates to a means for automatically calibrating a cycle rate counter or frequency-to-voltage converter for stabilizing the overall accuracy thereof in a series of circuits having poor long-time stability and good short-time stability.

The purpose of a cycle rate counter or frequency-to-voltage converter is to accept alternating current voltages of variable frequency and to convert this voltage of variable frequency into direct current voltages representative of corresponding frequencies. Instability inherent in electronic circuitry caused by temperature variations, aging, and voltage changes, or the like, often cause cycle rate counters or frequency-to-voltage converters to be unstable; that is, the desired proportion of frequency-to-voltage may change as a result of the instability of the cycle rate counter or frequency-to-voltage converter inherent in its own construction or by reason of connected circuitry. Any such instability causing the proportion of frequency-to-voltage to change will produce errors that are undesirable and intolerable in circuitry where accuracy is of the essence. In such cycle rate counters or frequency-to-voltage converters compensating circuitry is often employed to increase the accuracy of the circuit, which compensating circuitry is primarily for the purpose of nullifying any change in circuit constants. The compensating circuitry may itself need compensating circuitry.

In the present invention a cycle rate counter or frequency-to-voltage converter, which will be referred to hereinafter merely as a cycle rate counter, is employed in a circuit for receiving variable frequency voltages, such as Doppler voltages from radar, or the like, to convert the frequency thereof into direct current voltage, which voltage is conducted to a voltage information or memory circuit to be stored or remembered in a manner set forth in our patent application entitled "Voltage Information Storage Circuit," bearing Serial No. 784,010, filed December 30, 1958. In order to periodically calibrate and correct any inaccuracies in the cycle rate counter, the cycle rate counter is switched to receive stable calibrated oscillations, the frequency of which is selected to produce a predetermined direct current voltage on the output of the cycle rate counter. This cycle rate counter output is compared in a circuit with a direct current reference voltage equal to the anticipated predetermined voltage produced by the cycle rate counter from the calibrated or fixed oscillations. Any voltage difference in the anticipated and reference voltages produced by the comparison is applied to a calibrated memory or storage circuit, which storage circuit may be of a Miller type memory circuit similar to the voltage information storage circuit of our above-mentioned patent application, or of any suitable type. This calibrated stored voltage will be applied constantly to the biasing circuit of the cycle rate counter to cause compensation in the cycle rate counter biasing circuit to correct any frequency-to-voltage inaccuracies caused by drift, temperature variations, voltage changes, et cetera. The cycle rate counter may be switched periodically in short intervals by a common actuator of the switching means to cause constant recalibration of the cycle rate counter circuit to maintain thereby its accuracy and stability for converting variable frequency voltages to be stored for output circuitry in any well known and understood manner.

It is therefore a general object of this invention to provide a means and method of stabilizing the frequency-to-voltage proportion of a cycle rate counter by producing frequent intermittent recalibration of the biasing voltage for controlling this proportion in the cycle rate counter.

It is a further object of this invention to provide stability in the frequency-to-voltage conversion of a cycle rate counter by comparing the output voltage of the cycle rate counter from a predetermined frequency applied and comparing this output voltage with a voltage reference to produce a difference voltage thereof to be applied constantly to the biasing circuitry of the cycle rate counter, thereby stabilizing its frequency-to-voltage conversion.

These and other objects, advantages, features, and uses will become more apparent to those skilled in the art as the description proceeds when considered in view of the drawing illustrating the invention in its preferred form by a block circuit diagram using functional leads but not limited thereto in functional relationship.

Referring more particularly to the drawing, there is shown a cycle rate counter 10 for converting variable frequency voltages to direct current voltages, as is well understood by those skilled in the art. Such cycle rate counters may be of any suitable type for the purpose intended, as shown by the text, "Pulse and Digital Circuits," chapter 11, by Millman and Taub, McGraw Hill Book Company, 1956. The cycle rate counter 10 has an input circuit 11 coupled thereto through a switch $S_1$ from a variable frequency voltage conducted by way of conductor means 12. The switch $S_1$ is normally biased by a tension spring 13 to maintain circuit connection of the conductors 11 and 12, but is switchable to the lower contact connecting by way of conductor means 14 an oscillator circuit 15 designed to produce stable or non-variable oscillations. For the purpose of this description, the oscillator 15 will be referred to hereinafter as the calibrating oscillator.

An output 20 of the cycle rate counter 10 is coupled to the switch blade of an alternately seated switch $S_2$ which is normally biased to the upper contact connecting through a conductor means 21 to a voltage information storage circuit 22, the output of which may be coupled to indicator or control circuits as desired and necessary. The lower contact of switch $S_2$ couples by conductor means 23 to a comparator circuit 24, providing one input thereto. A second input to the comparator circuit 24 is connected by conductor means 25 to a voltage reference 26 of fixed and predetermined voltage level. While the reference voltage 26 is shown herein by a separate block, it is to be understood that such reference voltages are often incorporated in the comparator circuit as a part thereof. The voltage comparator circuit 24 may be of any desirable conventional type such as a capacitor comparator or a vacuum tube comparator of the type set forth in chapter 15 of the above-noted textbook. As is well understood in the art, the comparator circuit will compare two voltages entering between inputs 23 and 25 to provide a difference voltage on the output 27 which is selectively applied by the input conductor means 28 to a calibration memory or storage circuit 29. Conductor means 27 and 28 has its continuity established or broken by a switch means $S_3$ which is alternately seated between an upper dead pole 30 and a lower pole connected to the input conductor means 28. The switch blade normally connects the upper dead pole 30 and is selectively switchable to effect the continuity of conductor means 27 and 28. The alternately seated switch means $S_1$, $S_2$, and $S_3$ are associated with a common actutor means 31 and 32 to cause simultaneous actuation of all three switches. The switch actuator 31 and 32 may be under actuator control of an electromagnetic coil 33 providing a relay switch, generally referred to by 33S, which in common practice may be understood to be a three-blade, alternately seated relay switch. This relay switch may be under the control of an operator or other circuitry related to the variable frequency input voltage in any manner to cause periodic or intermittent actuation of the switches automatically or manually as desired and as necessity requires.

The calibrating memory or storage circuit 29 may be of the same or similar type as the voltage information storage circuit to produce on the output 35 thereof a substantially constant voltage, as described for such memory or storage circuits in our above-mentioned patent application. This stored difference voltage is applied by the conductor means 35 to a counter bias supply voltage network 36 which is related to the biasing voltage network in the cycle rate counter 10 by way of the conductor means 37. While the counter bias voltage network is shown by a separate block 36, it is to be understood that this network may be incorporated in the cycle rate counter circuit. The biasing voltage in the cycle rate counter controls the proportion of the frequency-to-voltage conversion for the cycle rate counter 10. Compensations in the cycle rate counter biasing circuit to maintain a constant or stable proportion between the variable frequency voltage applied and the direct current output voltage will stabilize the cycle rate counter under all conditions of applied variable frequency voltages. This will maintain the required accuracy of the cycle rate counter for voltages applied and stored in the voltage information storage or memory circuit 22 for indicating or controlling circuitry coupled to the output of the circuit 22.

In the operation of this invention, let it be assumed that relay switch 33S, operative to actuate switches $S_1$, $S_2$, and $S_3$, is resting in its normal upward position for converting variable frequency input voltages coming by way of conductor means 12 to produce direct current voltages on the output 20 representative of the corresponding input frequency to be applied and stored, by way of conductor means 21, in the voltage information storage circuit 22. At predetermined or fixed intervals of time the relay switch 33S will be energized to switch switch-sections S to the lower contacts, thereby placing the calibrating oscillator 15 in circuit with the cycle rate counter for a very short interval of time. The calibrating oscillator 15 produces a stabilized frequency prearranged to produce a known direct current voltage output on the cycle rate counter 10. This frequency may be such as to produce a direct current voltage, say, for example, 100 volts. The reference voltage 26 therefore should be 100 volts and invariable, as from a constant regulated source or batteries, as desired. Where it is desirable for certain circuit conditions, the reference voltage 26 could be above or below the predetermined direct current voltage so that the difference voltage would always be in a positive range or a negative range. The switch $S_2$ being down places the output of the cycle rate counter 10 in circuit to the comparator 24 to compare this output voltage with the reference voltage. If the output voltage from the cycle rate counter 10 is different from the reference voltage that is, above or below the 100-volt reference voltage, the difference, positive or negative, will be applied and stored in the calibrating memory or storage circuit 29 since the switch $S_3$ is likewise in its lower contact position at this moment. Since the relay switch 33S is switched only momentarily, the relay is deenergized and the variable frequency input voltage coming by way of the conductor means 12 is applied to the cycle rate counter 10 through the output 20 and the conductor means 21 to the voltage information storage circuit 22, as before. The difference voltage stored in the calibrating memory circuit 29 is applied to the counter bias supply voltage 36, which counter bias voltage is supplied by the conductor means 37 to the biasing network of the cycle rate counter to raise or lower this bias, to correct this bias, and to bring the output voltage on the cycle rate counter 20 back to the correct proportion of frequency-to-voltage, thus recalibrating the cycle rate counter. It is to be understood that this operation is substantially instantaneous so that recalibration of the cycle rate counter 10 is affected substantially instantly upon the energization of the relay switch 33S. Recalibration of the cycle rate counter is always on the basis of the stable or fixed frequency of the calibrating oscillator 15, this constant recalibration of the cycle rate counter circuit 10 providing stability for voltages of variable frequency applied by the conductor means 12. In this manner all direct current voltages, representative of the frequencies of voltages supplied by way of conductor means 12, will be accurate voltages stored in 22 for the purpose and necessity of downstream circuitry.

While many modifications and changes may be made in the constructional arrangement and features of this invention to adapt it for various applications and uses, the above description, taken in conjunction with the accompanying drawing, sets forth merely a preferred form of the invention, and we desire to be limited only by the scope of the appended claims.

We claim:

1. An automatic voltage calibrating system comprising: a frequency-to-voltage converter means for receiving alternating voltage signals of variable frequency and converting same to direct current voltage representations proportional to frequency; means for producing alternating current oscillations of a frequency to produce a predetermined direct current voltage in said converter means; comparator means for comparing the predetermined direct current voltage with a reference voltage producing a difference voltage applied to said converter means for correcting the bias thereof; and switchable means coupling said converter means, said means for producing alternating current oscillations, and said comparator means for selective switching to make repeated bias corrections on said converter means.

2. An automatic voltage calibrating system comprising: a frequency-to-voltage converter circuit coupled to receive variable frequency voltage for conversion to direct current voltage applicable to controlling circuits; a calibrating oscillating circuit for prducing stable oscillations convertible to a predetermined direct current voltage by said converter circuit; comparator means for comparing said predetermined direct current voltage with a reference direct current voltage producing a difference voltage applied by coupling to said converter circuit for controlling the bias thereof to control the frequency-to-voltage relationship; and switch means in said converter circuit coupling selectively switchable to switch said variable frequency and said calibrating oscillating circuit and comparator to said converter circuit whereby said converter circuit is maintained accurate for conversion of variable frequency voltages to direct current voltages.

3. An automatic voltage calibrating system as set forth in claim 2 wherein said coupling between said comparator means and said converter circuit for conducting said difference voltage includes a storage network for storing said difference voltage when said switch means is selected to couple said variable frequency voltage to said converter circuit.

4. An automatic voltage calibrating system as set forth in claim 3 wherein said difference voltage is bi-polar and its control of the bias voltage of said converter circuit is by counter biasing means.

5. An automatic voltage calibrating system for stabilizing a frequency-to-voltage converter comprising: a cycle rate counter for converting cycled voltages of variable frequency into direct current voltage proportional to the frequency of said cycled voltages; a calibrating oscillator for producing stable oscillations convertible to a predetermined direct current voltage by said cycle rate counter; a comparator network for comparing the predetermined direct current voltage with a reference direct current voltage producing a difference voltage therefrom; a storage network coupled to said comparator network for storing said difference voltage, said storage network being coupled to said cycle rate counter for controlling the frequency-to-voltage proportion with said difference voltage; and a switching means for selectively switching said calibrating oscillator in circuit with the input of said cycle rate counter and for simultaneously switching the output of said cycle rate counter in circuit with the input of said comparator network to compare the predetermined direct current voltage with said reference direct current voltage whereby said cycle rate counter is stabilized at the proper frequency-to-voltage proportion.

6. An automatic voltage calibrating system as set forth in claim 5 wherein said coupling of said storage network to said cycle rate counter for controlling the frequency-to-voltage proportion is a coupling to the biasing voltage of said cycle rate counter wherbey the change in biasing voltage will change the output direct current voltage level directly with each corresponding input voltage frequency.

7. An automatic voltage calibrating system as set forth in claim 6 wherein said storage network is a Miller type memory circuit.

8. An automatic voltage calibrating system for stabilizing a frequency-to-voltage converter comprising: a cycle rate counter for converting applied alternating current voltage to a direct current voltage proportional to the applied voltage frequency for converting variable alternating current voltage intelligence signals into direct current voltage intelligence signals; means stabilizing the correct proportional relationship of frequency-to-voltage in said cycle rate counter, said means including a calibrating circuit for producing fixed oscllations of voltage representative of a predetermined voltage level, a comparator for comparing said predetermined voltage level with a reference voltage level providing a difference voltage, and a storage network coupled to said comparator for storing said difference voltage and coupled to said cycle rate counter for applying said difference voltage to the biasing voltage of said cycle rate counter to control the frequency-to-voltage proportion; and switch means associated with said cycle rate counter, said comparator, and said coupling of said comparator and storage network and adapted to periodically, simultaneously, and selectively place said cycle rate counter in circuit with said stabilizing means and with applied alternating current voltages whereby the bias on said cycle rate counter is repeatedly corrected at short intervals to provide long-time stability of the frequency-to-voltage proportion.

9. An automatic voltage calibrating system as set forth in claim 8 wherein said storage network is a Miller type memory circuit and said calibrating circuit is a stable oscillator.

10. An automatic voltage calibrating system for stabilizing a frequency-to-voltage converter comprising: a frequency-to-voltage converter having an input adapted to have Doppler radar signals applied thereto and an output adapted to be coupled to voltage information storage circuitry for converting Doppler variable alternating current voltages into direct current voltages proportional to frequency in accordance with a bias supply voltage thereon; a stable oscillator circuit for producing voltage oscillations convertible to a predetermined voltage level, said oscillator being coupled through first switch means to selectively connect in one position said converter to provide continuity of said input to receive input Doppler signals and in another position said converter input and said oscillator; a comparator network having one input connectible through a second switch means, a second input coupled to a reference direct current voltage source, and an output for comparing two voltages and producing a difference voltage on said output, said second switch means being selectively switchable in one position to provide continuity in the output and in another position to connect the converter output to said one input of said comparator; a storage network connectible through a third switch means to the output of said comparator and having an output coupled to the bias supply voltage of said converter for controlling the frequency-to-voltage proportion in accordance with said difference voltage, said third switch means being switchable in one position to open the connection between said comparator output and said storage network and in another position to connect said comparator output to said storage network; and a switch actuator means associated with said first, second, and third switch means to actuate same intermittently, momentarily, alternately, and simultaneously to said one and other positions whereby said frequency-to-voltage converter is periodically calibrated to stabilize the frequency-to-voltage proportion.

11. An automatic voltage calibrating system as set forth in claim 10 wherein said storage network is a Miller type memory circuit and said bias supply voltage includes a counter bias voltage supply, said counter bias voltage supply being controlled by said difference voltage from said memory circuit to change said bias supply voltage.

References Cited in the file of this patent

UNITED STATES PATENTS

| | | |
|---|---|---|
| 2,419,527 | Bartelink | Apr. 29, 1947 |
| 2,424,833 | Karman | July 29, 1947 |
| 2,606,956 | Axelrod | Aug. 12, 1952 |
| 2,767,375 | Schramm | Oct. 16, 1956 |
| 2,796,533 | Morton et al. | June 18, 1957 |
| 2,887,654 | Strassman et al. | May 19, 1959 |